United States Patent
Voit et al.

(10) Patent No.: US 6,430,275 B1
(45) Date of Patent: *Aug. 6, 2002

(54) ENHANCED SIGNALING FOR TERMINATING RESOURCE

(75) Inventors: Eric A. Voit, Baltimore; Edward E. Balkovich, Potomac, both of MD (US); William D. Goodman, Collegeville, PA (US); Jayant G. Gadre, Oakton; Patrick E. White, Vienna, both of VA (US); David E. Young, Silver Spring, MD (US)

(73) Assignee: Bell Atlantic Services Network, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/362,554

(22) Filed: Jul. 28, 1999

Related U.S. Application Data

(63) Continuation of application No. 08/931,159, filed on Sep. 16, 1997.

(51) Int. Cl.[7] ............................................. H04M 15/00
(52) U.S. Cl. ............................... 379/114.17; 379/114.2; 379/114.03
(58) Field of Search .......................... 370/352; 379/112, 379/114, 144, 91.01, 900, 115, 130, 127, 116, 119

(56) References Cited

U.S. PATENT DOCUMENTS

| | | |
|---|---|---|
| 4,916,491 A | 4/1990 | Katoh |
| 5,146,491 A | 9/1992 | Silver et al. |
| 5,247,571 A | 9/1993 | Kay et al. |
| 5,303,297 A * | 4/1994 | Durrell et al. ............... 379/114 |
| 5,440,621 A * | 8/1995 | Castro ........................ 379/112 |

(List continued on next page.)

OTHER PUBLICATIONS

Yang, C., INETPhone: Telephone Services and Servers on Internet. http://ds.internic.net/rfc/rfc 1789.txt.

Primary Examiner—Curtis Kuntz
Assistant Examiner—Rexford M Barnie

(57) ABSTRACT

An internetwork (such as the Internet) telephony system and method incorporating architecture and methodology which facilitates a high degree of scalability. The scalability provides improvement dealing with usage recording, usage pricing, billing account management, and fraud control. The scalability is achieved primarily by bundling of usage recording, pricing, authorization and billing practices in one logical database object which may be physically distributed. A predefined set of network elements are provided access to the database object to obtain authorization for a call along with limitations on the maximum cost or duration of the call for the particular account involved. The database object records usage statistics relating to the completed call, including pricing, and this data is available for virtually immediate billing. The database object provides to customers on a virtual real time basis the customer's usage statistics, including statistics for a call in progress. The operation proceeds in the following manner. Each Internet telephone service subscriber will have at least one billing and authorization account maintained in a database on the Internet. During set-up of a call, the hop-off gateway will obtain identification and password information from the caller. The gateway then communicates with the database to determine if the call is authorized and to negotiate the overall billing algorithm. When the call if finished, the gateway will report usage data to the database for billing purposes.

31 Claims, 12 Drawing Sheets

U.S. PATENT DOCUMENTS

| | | | |
|---|---|---|---|
| 5,469,497 A | | 11/1995 | Pierce et al. |
| 5,506,893 A | | 4/1996 | Buscher et al. |
| 5,559,871 A | | 9/1996 | Smith |
| 5,590,133 A | | 12/1996 | Billstrom et al. |
| 5,608,786 A | | 3/1997 | Gordon |
| 5,621,787 A | * | 4/1997 | McKoy et al. ............... 379/144 |
| 5,661,790 A | | 8/1997 | Hsu |
| 5,712,907 A | | 1/1998 | Wegner et al. |
| 5,724,355 A | | 3/1998 | Bruno et al. |
| 5,726,984 A | | 3/1998 | Kubler et al. |
| 5,737,414 A | | 4/1998 | Walker et al. |
| 5,751,961 A | | 5/1998 | Smyk |
| 5,793,762 A | | 8/1998 | Penners et al. |
| 5,799,072 A | * | 8/1998 | Vulcan et al. ............... 379/114 |
| 5,802,502 A | | 9/1998 | Gell et al. |
| 5,825,863 A | * | 10/1998 | Walker ....................... 379/144 |
| 5,828,740 A | * | 10/1998 | Khuc et al. ................. 379/144 |
| 5,838,682 A | | 11/1998 | Dekelbaum et al. |
| 5,845,267 A | | 12/1998 | Ronen |
| 5,850,433 A | | 12/1998 | Rondeau |
| 5,864,610 A | | 1/1999 | Ronen |
| 5,867,495 A | | 2/1999 | Elliott et al. |
| 5,883,891 A | | 3/1999 | Williams et al. |
| 5,889,774 A | | 3/1999 | Mirashrafi et al. |
| 5,905,736 A | * | 5/1999 | Ronen et al. ................ 379/144 |
| 5,907,547 A | | 5/1999 | Foladare et al. |
| 5,910,946 A | | 6/1999 | Csapo |
| 5,915,005 A | * | 6/1999 | He ............................. 379/115 |
| 5,923,659 A | | 7/1999 | Curry et al. |
| 5,930,343 A | * | 7/1999 | Vasquez ...................... 379/115 |
| 5,937,045 A | * | 8/1999 | Yaoya et al. ................. 379/115 |
| 5,940,598 A | | 8/1999 | Strauss et al. |
| 5,953,504 A | | 9/1999 | Sokal et al. |
| 5,956,391 A | | 9/1999 | Melen et al. |
| 5,970,477 A | * | 10/1999 | Roden ........................ 379/112 |
| 5,974,043 A | | 10/1999 | Solomon |
| 5,991,291 A | * | 11/1999 | Asai et al. ................... 379/352 |
| 6,005,926 A | | 12/1999 | Mashinsky |
| 6,014,379 A | | 1/2000 | White et al. |
| 6,021,126 A | | 2/2000 | White et al. |
| 6,052,445 A | * | 4/2000 | Bashoura et al. ....... 379/100.14 |
| 6,069,890 A | * | 5/2000 | White et al. ............. 379/90.01 |
| 6,104,704 A | * | 8/2000 | Buhler et al. ................ 379/114 |
| 6,115,737 A | * | 9/2000 | Ely et al. .................... 709/230 |
| 6,141,404 A | * | 10/2000 | Westerlage et al. ......... 379/118 |

\* cited by examiner

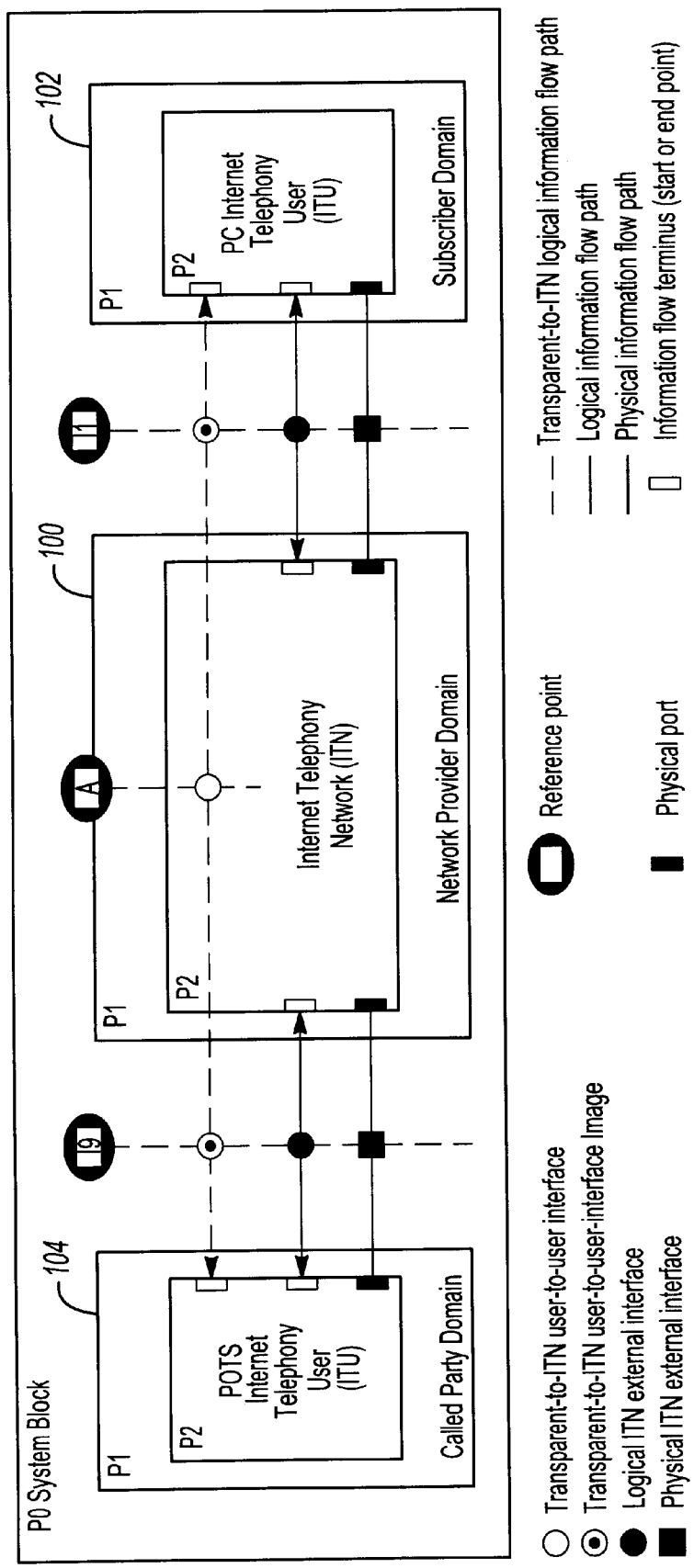

ENHANCED SIGNALING FOR TERMINATING RESOURCE

This is a continuation of Ser. No. 08/931,159 filed Sep. 16, 1997.

FIELD OF INVENTION

This invention relates to methods and systems for managing signaling and communication sessions across networks, and particularly relates to a scalable methodology and system for managing telephony over hybrid networks such as combined switched telephone networks and packet switched internetworks, such as the Internet.

BACKGROUND OF THE INVENTION

Attention recently has been directed to implementing a variety of communication services, including voice telephone service, over the worldwide packet data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP. The TCP/IP protocols were originally developed for use only through ARPANET but have subsequently become widely used in the industry. TCP/IP is flexible and robust. TCP takes care of the integrity, and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

FIG. 3 shows a simplified diagram of the Internet and various types of systems which are typically connected. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIG. 3 at 310, 312 and 314. The Autonomous Systems (ASs) are linked by Inter-AS Connections 311, 313 and 315. Information Providers (IPs) 316 and 318, such as America Online (AOL) and CompuServe, connect to the Internet via high speed lines 320 and 322, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and the Microsoft Network (MSN) is an IP using UUNET as an ISP. Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 340 and 342 are representative of computers connected to the Internet via the public switched telephone network (PSTN), and are shown connected to the AS/ISPs via dial up links 344 and 346.

In the addressing scheme of the Internet, an address comprises four numbers separated by dots. This is called the Internet Protocol address, or IP address. An example of an IP address would be 164.109.211.237. Each machine on the Internet has a unique number assigned to it which constitutes one of these four numbers. In the IP address, the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a packet bearing a destination address leaves the source router, the router examines the first two numbers in a matrix table to determine how many hops are the minimum to get to the destination. It then sends the packet to the next router as determined from that table, and the procedure is repeated. Each router has a database table that finds the information automatically. This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and ATM or voice.

It would be difficult for most people to remember the four separate numbers (sometimes having ten or more digits) comprising each numeric IP address. In addition numeric IP addresses occasionally change, making it even more of a problem for people to keep track of them. The Domain Name System (DNS) was developed to provide some relief from these problems. In the DNS system words, which are more easily remembered, are used instead of numbers.

An example of a textual Domain Name is Evoit@HUT.MB.COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right.

The top-level domains, those of the most general significance, are as follows:

1. COM A commercial operation
2. EDU A university, college or other educational institution
3. GOV A government organization
4. MIL A military site 5. ORG Any organization that does not fit into any of the preceding 6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is ever increasing. Computers associated with the Internet called domain name servers convert textual domain names into numeric IP addresses.

Recently, one or more companies have developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

Such programs have relied on servers coupled to the Internet to establish voice communication links through the networks. Each person active on the network, who is willing to accept a voice call, must register with a server. A calling party can call only those persons registered on the voice communication server. Also, the address management provided by these servers, like that provided by the domain name servers, has not permitted any individualized control of routing. For example, a user could register only one current address and must reregister each time the user comes on-line with a new address. The registration server provides no automatic selection of alternate destinations.

Concurrent with recent developments in public packet data communications such as the Internet, outlined above, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". For ordinary telephone service calls, there would be no event to trigger AIN processing. The local and toll office switches would function normally and process such calls without referring to the central database for instructions. An office which detects a trigger will suspend call processing, compile a call data message and forward that message via a common channel interoffice signaling (CCIS) link to a database system, such as an Integrated Service Control Point (ISCP). Each ISCP includes a Multi-Services Application Platform (MSAP) database.

If needed, an ISCP can instruct the central office to obtain and forward additional information. Once sufficient information about the call has reached the ISCP, the ISCP accesses its stored data tables in the MSAP database. Using those tables it translates the received message data into a call control message and returns the call control message to the switching office of the network via CCIS link. The network switching offices then use the call control message to complete the particular call. An AIN type network for providing an Area Wide Centrex service, for example, was disclosed and described in detail in commonly assigned U.S. Pat. No. 5,247,571 to Kay et al., the disclosure of which is entirely incorporated herein by reference.

As shown by the art discussed above, the Internet and the AIN have remained separate, independent areas of technical development. Many telephone service subscribers are accustomed to enhanced telephone features, such as those provided by AIN processing. However, the wide range of conditional routing options offered by AIN type processing have not been available on the Internet. For example, the address processing provided by the domain name servers and the registration servers used to exchange addresses for voice communication have not permitted alternate treatments for different times, different calling parties, different destinations of roaming subscribers, etc. An enhanced domain name server which enables conditional routing and which is capable of wide database applications was disclosed and described in detail in commonly assigned Eric A. Voit U.S. application Ser. No. 08/812,075, filed Mar. 6, 1997. The disclosure of that application is entirely incorporated herein by reference.

As use of the Internet expands, particularly for transport of voice telephone communications, a need exists not only for enhanced address management but also for distributed and scalable customer account authentication, authorization, usage recording, usage pricing billing account management, and inter carrier interfaces. The enhanced domain server described in the above incorporated Voit application Ser. No. 08/812,075 lends itself to serving in this capacity.

Voice over internetworks, and particularly the Internet (V/IP), involves terminal equipment affiliated with various networks. V/IP services can be divided into at least four categories based on the type of network to which the users' terminal equipment is attached, such as Internet/Intranet or narrowband Public Switched Telephone Network (PSTN) or POTS (plain old telephone service) telephone network. These four categories are:

1. Personal Computer (PC)—PC
2. PC—Telephone
3. Telephone—PC
4. Telephone—Telephone Existing V/IP implementations over the Internet are subject to best-effort quality of service (QoS). Typically, this is noticeably degraded as compared to "toll quality" service. In addition, it is subject to significant variations. There is a need for improvement over these existing implementations both in level and consistency of QoS. The QoS should be such as to be perceived by end users as consistently supporting comfortable conversation similar to that which users are accustomed. Preferably the QoS should be equivalent to "toll quality" voice service.

Residential and business customers on the PSTN are accustomed to the availability of enhanced calling features and it is desirable to provide personal dialing directories, ability to use multiple point to point connections at the same time, multi-line conferencing capabilities, and full duplex operation. Authorization and security features should be supplied, as well as user access to billing and usage accounting relating to their own accounts.

DISCLOSURE OF THE INVENTION

It is a primary objective of the present invention to satisfy the needs which have been described.

The present invention addresses those needs by providing a robust and scalable customer account management database within the packet switched network. This database may act as manager of all transactions for a particular customer account. Each Internet telephone service subscriber will have at least one billing and authorization account maintained in a database on the Internet. During set-up of a call, the hop-off gateway will obtain identification and password information from the caller. The gateway then communicates with the database to determine if the call is authorized and to negotiate the overall billing algorithm. When the call is finished, the gateway will report usage data to the database for billing purposes.

Another objective is to provide an overall internetwork architecture that will permit the development of Internet Telephony Gateways (ITGs) capable of dealing with existing problems on a scalable basis. For example, in view of the fact that there is no "originating switch" to generate billing records for an internetwork caller, there is no present system for providing a generation site which will implement a unitary presentation of customer account usage, and also support extraction of data from the network on a real time basis. There is no present architecture for ensuring customer authentication and billing beyond a limited number of customers.

It is another objective of the invention to implement a system to inform a customer of the pricing rules for a call prior to call connection and to report the price of the call in real time visually or orally.

It is yet another objective of the invention to provide a system to implement the handling of multiple, concurrent calls terminating at different ITGs using the same billing account number and preventing overrun of a preset account spending limit.

It is a still further objective of the invention to ensure that such a system will operate properly in situations where the ITG is owned by a different company than the owner of the customer account.

It is another objective of the invention to provide a mechanism for reducing the potential for fraud.

According to the invention usage recording, pricing, and authorization are bundled into one logical object. This eliminates the separation between authorization and billing processes and significantly reduces the potential for fraud in a regionally deployed system. By having a single logical database which is managing customer authentication, authorization, and usage pricing for the overall network, a transaction-based approach to updating data is possible. This minimizes opportunities for fraud based on exploitation of temporary inconsistencies of partitioned or replicated data bases. There is no requirement that this logical object be implemented as a single physical system.

The single logical element or object is invoked during a call when an authorization request is received. This request may consist of an account number and password provided by a PC user to be authenticated. At this point the logical database processor checks the account password and available account balance. If the password is correct and the remaining balance in the account permits the call to be established, the object responds affirmatively to the Internet Telephony Network (ITN). Call Control Object which includes the Internet Telephony Gateway (ITG). The database retains data indicating that a call associated with that account is in progress. In such an architecture mutual authentication by the Call Control Object and ITG and the database is preferable, as is a secure (such as by encryption) call transaction between them.

In providing the authorization, the database object will evaluate the customer account status to determine if there are multiple connections currently in service, possibly across multiple ITGs. With this state information, the authorization function of the system may ensure that only one call per account is being handled by the network, and/or ensure that the maximum billing limit is not being circumvented by multiple concurrent sessions. In the absence of such a precaution, a second PC caller using the same account and password might receive authorization for a call prior to the posting of the first caller's usage record. Optionally, in order to handle low billing amount availability without denying a call completely, the database object may respond to the ITN with a maximum allowable call duration.

Another feature is that the database object may reserve a predetermined remaining balance on the account for the call so that additional calls related to that account will not result in exceeding the account's limit. The database object may return the pricing algorithm for the usage to the Call Control Object and ITG, which will pass it on to the PC user. In this way the PC user knows the initial charge and ongoing per minute rate for the usage. This is particularly important when the Call Control Object and ITG is owned by a different company than the database object. The user desires to know the rates that will be charged prior to completing the call. The PC is such as to be able to receive and utilize the algorithm, and display pricing to the PC user. The PC may also present the total charge being incurred by the user on a real time basis as the call progresses.

After the completion of the call, the database object is also responsible for accepting usage recording data which has been generated by the Call Control Object and ITG, pricing the usage, and decrementing that priced amount from a customer's available balance. The database object then logs the final call data. Preferably the Call Control Object and ITG also logs and maintains the call detail information. This feature is very useful in the situation where the Call Control Object and ITG and the database objects are owned by different companies. In this case, the database object data can be used by the owner of the database object to manage the customer account. In addition, the Call Control Object and ITG data can be used by the owner of the Call Control Object and ITG to charge the database object for the completion of the call over its facilities. In effect this Call Control Object and ITG data becomes the basis for a usage based settlement interface between carriers.

Preferably the database object is partitioned and may be distributed. A database object partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system. With such a partitioned customer account data architecture, it becomes possible to divide the totality of all managed accounts into implementable sub-groups in a straight forward manner.

It is an objective of the invention to provide a code based means of querying a distributed database of codes which allows automatic accessing of the pertinent physical instance of the database for approval.

It is another objective of the invention to provide such a database and functionality on a scalable basis.

Additional objects, advantages and novel features of the invention will be set forth in part in the description which follows, and in part will become apparent to those skilled in the art upon examination of the following or may be learned by practice of the invention. The objects and advantages of

BRIEF DESCRIPTION OF DRAWINGS

FIG. 1A is a high level (partition 1 level) diagram of a PC to Phone Internet Telephony architecture of one embodiment of the system of the invention.

BEST MODE FOR CARRYING OUT THE INVENTION

Referring to FIG. 1A there is illustrated a high level (partition 1) reference model of the Internet Telephony Network or ITN. The center block 100 is the Internet Telephony Network or ITN, is shown in this illustration as managing a customer call between a PC and a POTS telephone. This ITN is in the Network Provider Domain and is responsible for all functions required of a traditional POTS network, i.e., call set-up, usage accounting, surveillance, etc. The ITN spans both the circuit switched network (such as a Public Switched Telephone Network or PSTN) and the packet switched (Internet Protocol or IP—frame relay, etc.) networks. The PC Internet Telephony User (ITU or computer or PC user) is shown at 102 in the Subscriber Domain and the called POTS Internet Telephony User (ITU or telephone user) is shown at 104 in the Called Party Domain. The interface between the PC user and the ITN is designated I1, while the interface between the POTS user and the PSTN is designated I9. I9 represents a standard analog or digital telephone interface.

Figure 1B:
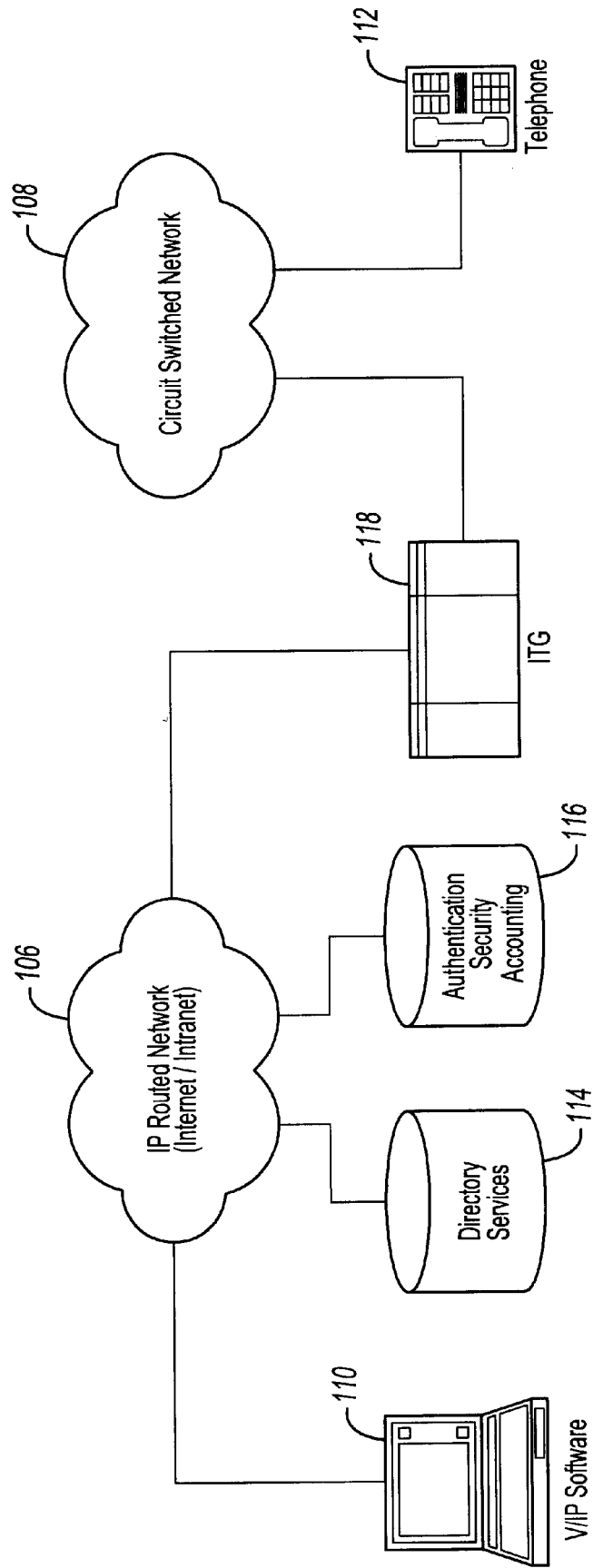
FIG. 1B is another simplified high level diagram of the generic system.

FIG. 1B shows a different high level depiction of the generic system wherein the packet switched and circuit switched networks are separately shown at 106 and 108. In this figure the end-to-end system connects a laptop computer 110 and a telephone 112. These constitute respectively the PC user call control object U1 and the U3 POTS U1 service user, as is presently described in further detail. The directory services object 114 and authentication and security accounting object 116 are coupled to the packet switched IP routed network 106. These constitute respectively the C1 ITN directory object and the C3 authorization, usage recording and pricing object, as presently described in further detail.

According to an aspect of the invention the C3 object is implemented in a manner such that multiple sites maintain their own database servers 116 and no single site on the Internet or other network 106 is in possession of all of the authentication, authorization, usage pricing, and account data. The overall data constitutes a distributed database, which forms a unitary logical object that relies on the database servers 116 at the individual sites. Operation is such that a local C3 database 116 or server receives a request for data. If the local server database 116 cannot locate the requested information it sends a request to a second database server 116 asking it to locate the information and send the results back to the requester. The second database server 116 locates the information and sends a message to the requester. If the second database server 116 cannot locate the information in its database it (or the local server database) sends a similar request to the next database server 116, and so on, until the desired information is located. Alternatively, the account number may be coded so as to indicate the proper database instance 116.

The Internet Telephony Gateway or ITG 118 connects the packet switched and circuit switched networks. This is sometimes referred to herein as the C2 ITN call control object. The computer may be linked to the packet switched network via any available computer to Internet link. Similarly the connection between the circuit switched network and the telephone may be any of the conventional links including POTS.

It should be appreciated that while FIG. 1B shows only two gateways 118 between the IP network 106 and the circuit switched network (e.g. the PSTN), a plurality of gateways 118 exist serving various regional areas.

Figure 2:
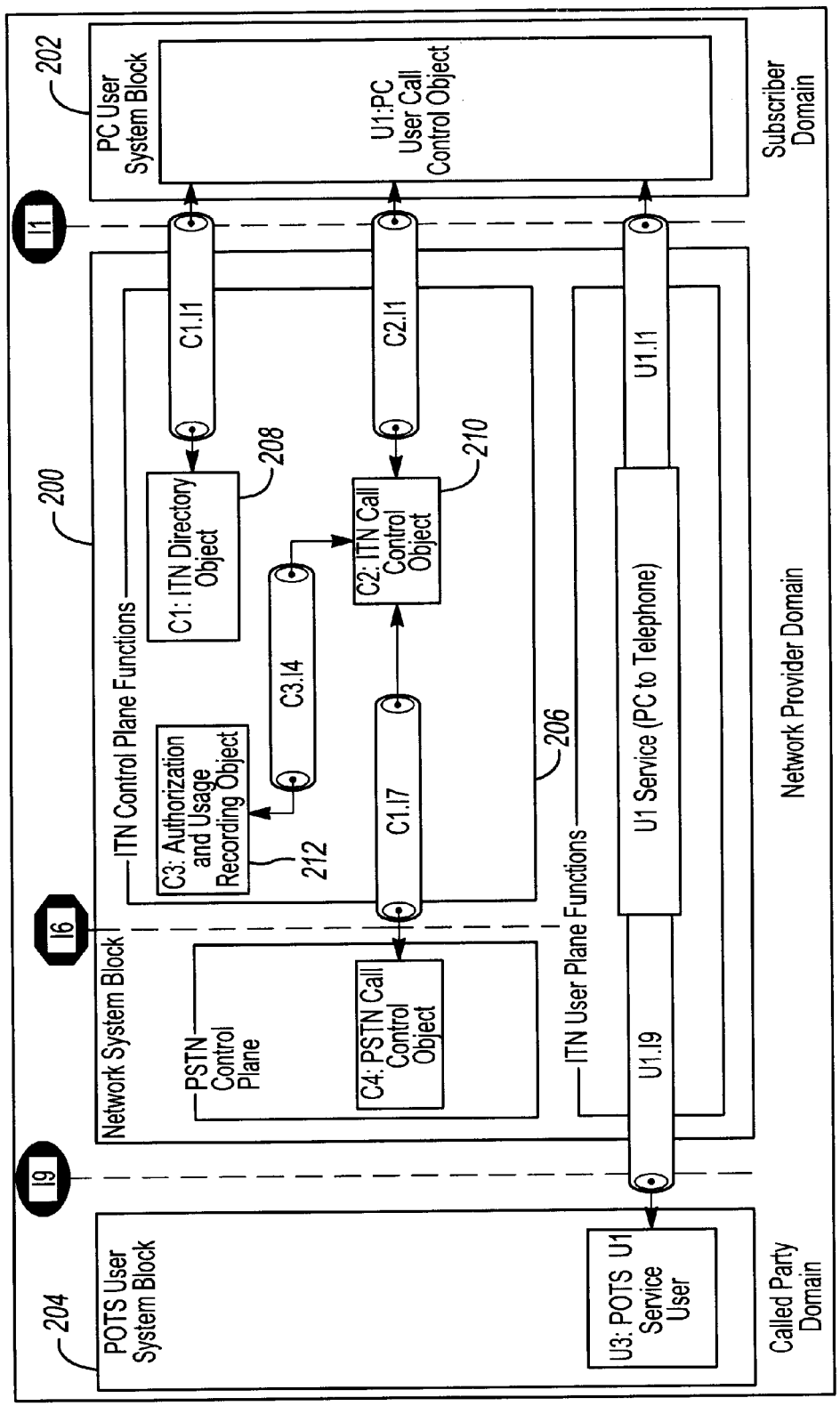
FIG. 2 is a diagram of one embodiment of a preferred architectural implementation showing interfaces between IP network elements.
Figure 3:
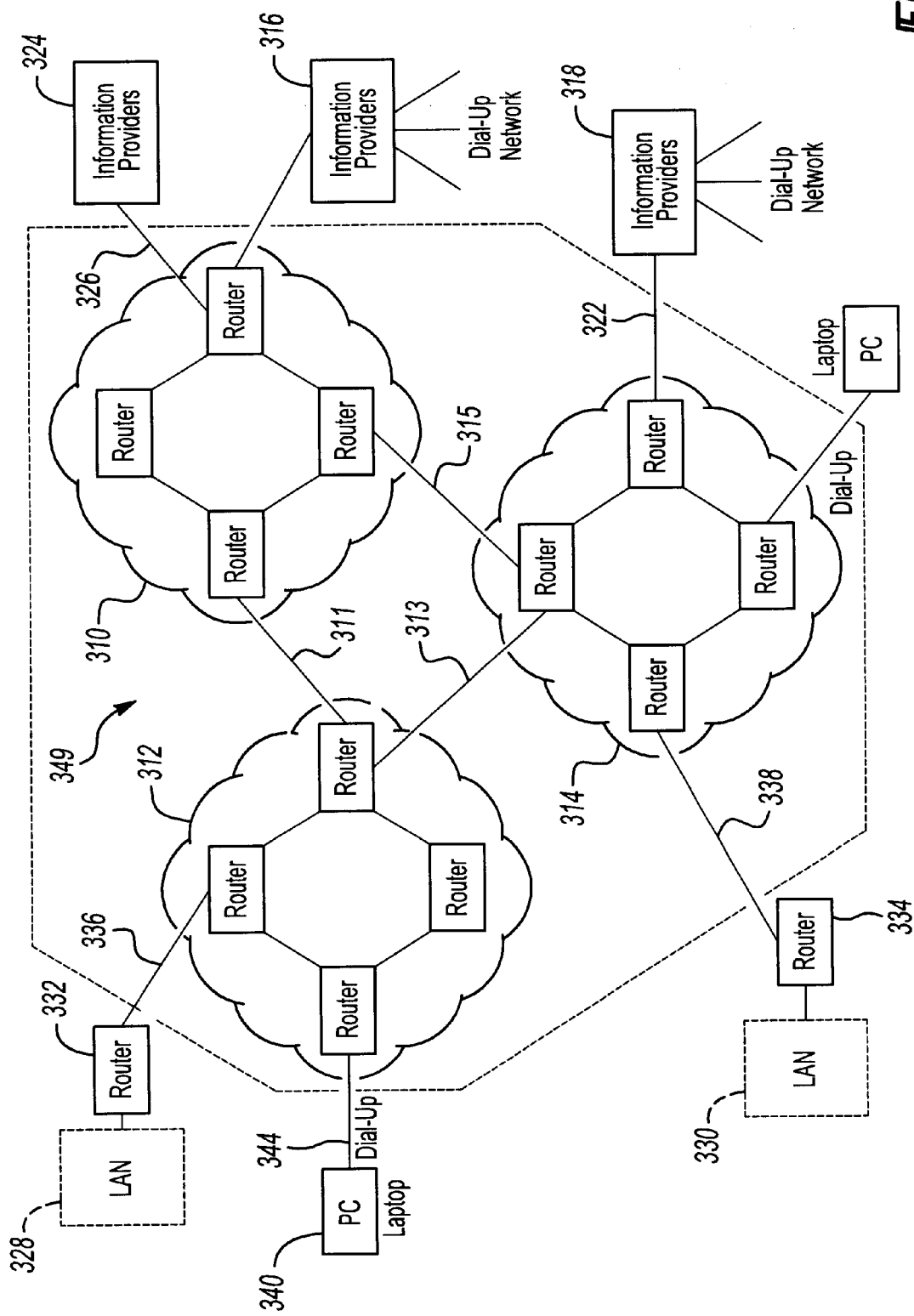
FIG. 3 shows a simplified diagram of the Internet and various types of systems typically connected thereto.

In order to manage a call across the circuit switched and packet switched and packet switched networks, it is necessary to provide an architecture, a set of interfaces, and a call flow. FIG. 2 is a diagram showing the interfaces between IP network elements in one architectural implementation. Referring to that figure there is shown at 202 the PC user System Block in the subscriber domain, at 200 the Network System Block or network provider domain, and at 204 the POTS User System Block or called party domain. Within the Network System Block the ITN Control Plane functions are illustrated at 206. The ITN Control Plane functions are those which establish and tear-down communication paths across the User Plane. Three Control Plane Objects are illustrated, namely:

C1: The Internet Telephony Gateway Directory Object

C2: The Internet Telephony Call Control Object

C3: The Internet Telephony Authorization and Usage Recording Object

These objects are shown respectively at 208, 210, and 212. Not shown in this figure is the PSTN Call Control Object C4 since neither the PSTN network elements nor the PSTN protocols are modified by the ITN system.

The C3 object represents the network element required in this architecture to perform customer authentication, call authorization, usage accounting, and usage pricing for a particular PC user's customer account. By bundling usage recording, pricing, and authorization into this one logical object, it is possible to eliminate the conventional separation between authorization and billing processes and significantly reduce the potential for fraud in a regionally deployed system. By having a single logical database which is managing customer authentication, authorization, and usage pricing for the network, a transaction-based approach to updating data is possible. This minimizes opportunities for fraud based on exploitation of the conventional temporary inconsistencies which are encountered with partitioned or replicated data bases. There is no requirement that this unitary logical object be implemented as a single physical system. Although not shown here, C3 can also respond to real time requests from external OSS systems for usage record details and account status information for the customer account.

The C3 object ensures coordination between User Authorization and Usage Recording for a single PC user's customer account. C3 also responds to external requests for that information.

According to the invention the C3 object is implemented in a manner such that multiple sites maintain their own database servers and no single site on the Internet is in possession of all of the authentication, authorization, usage pricing, and account data. The overall data constitutes a distributed database which forms a unitary logical object which relies on the database servers at the individual sites. Operation is such that a local C3 database or server receives a request for data. If the local server database cannot locate the requested information it sends a request to a second database server asking it to locate the information and send the results back to the requester. The second database server locates the information and sends a message to the requester. If the second database server cannot locate the information in its database it (or the local server database) sends a similar request to the next database server until the desired information is located. Alternatively, the account number may be coded so as to indicate the proper database instance. Database servers with this capability are described in detail in the common assignee's copending Sistanizadeh application Ser. No. 08/634,544, filed Apr. 18, 1996. That application is incorporated by reference herein in its entirety.

The C3 object is invoked during a call when an Authorization request is relayed over the interface C3.I4. This interface is responsible for allowing an authorization of ITG usage by a service subscriber, and for maintaining the current state of a subscriber's connections within C3, as well as passing ITG generated usage records from C2 to C3 in real time. Communication through the C3.I4 interface is preferably encrypted and secure. The authorization request relayed over C3.I4 typically consists of an account number and password provided by the PC User to be authenticated by C3. At this point C3 checks the account password and available account balance. If the password is correct and the account remaining balance permits the call to be established, then C3 responds affirmatively to C2. C3 also retains data indicating that a call associated with that account is in progress. In such an architecture, mutual authentication of C2 and C3, and a secure transaction between them is preferred.

In providing the authorization, C3 evaluates the customer account status to determine if there are multiple connections currently in service (possibly across multiple ITGs). It should be appreciated that while FIG. 2 shows only a single gateway between a PC user and the ITN (via the PSTN), a plurality of gateways exist serving the various regional areas from which subscribers may request service. With the state information obtained from the C3 status evaluation the authorization system may ensure that only one call per account is being handled by the network, and/or ensure that the maximum billing limit is not being circumvented by multiple concurrent sessions. If this precaution is not provided a second PC caller using the same account and password might receive authorization for a call prior to the posting of the first caller's usage record. Optionally, in order to handle low billing amount availability without denying a call completely, C3 can respond to C2 with a maximum allowable call duration.

Another feature is that C3 may reserve a certain remaining balance on the account for the call so that additional calls related to that account will not result in exceeding that account's limit. C3 may return the pricing algorithm for the usage to C2 which will pass it on to the PC user. In this way the PC user knows the initial charge and ongoing per minute rate for the requested usage. This is particularly important when C2 is owned by a different company than C3, and the user wants to know the overall rates that will be charged prior to completing the call. The PC is such as to be able to receive and utilize the algorithm, and display pricing to the user. The PC is also able to present the total charge being incurred by the user as time goes on during the call.

After the completion of the call, the C3 object is also responsible for accepting usage recording data from C2, pricing the usage, and decrementing that priced amount from a customer's available balance. C3 then logs the final call data. Preferably C2 also logs and maintains the call detail information. This feature is very useful in the situation where C2 and the C3 database objects are owned by different companies. In this case, the database object data can be used by its owner to manage the customer account. In addition, the C2 data can be used by the owner of the C2 object to charge the C3 database object for the completion of the call over its facilities. In effect this C2 data becomes the basis for a usage based settlement interface between carriers.

Preferably the C3 system is partitioned. Such a partition may be made by a field identifying the carrier owning the customer account, a sub-field within the customer account number (such as NPA-NXX), the customer's telephone number, the customer's e-mail domain name, the customer's originating IP address, or some other field. Each partitioned database may then be placed on its own physical system on a geographical or other basis. With such a partitioned customer account data architecture, the domain of all managed accounts may be divided into efficiently implementable subgroups.

Figure 4:
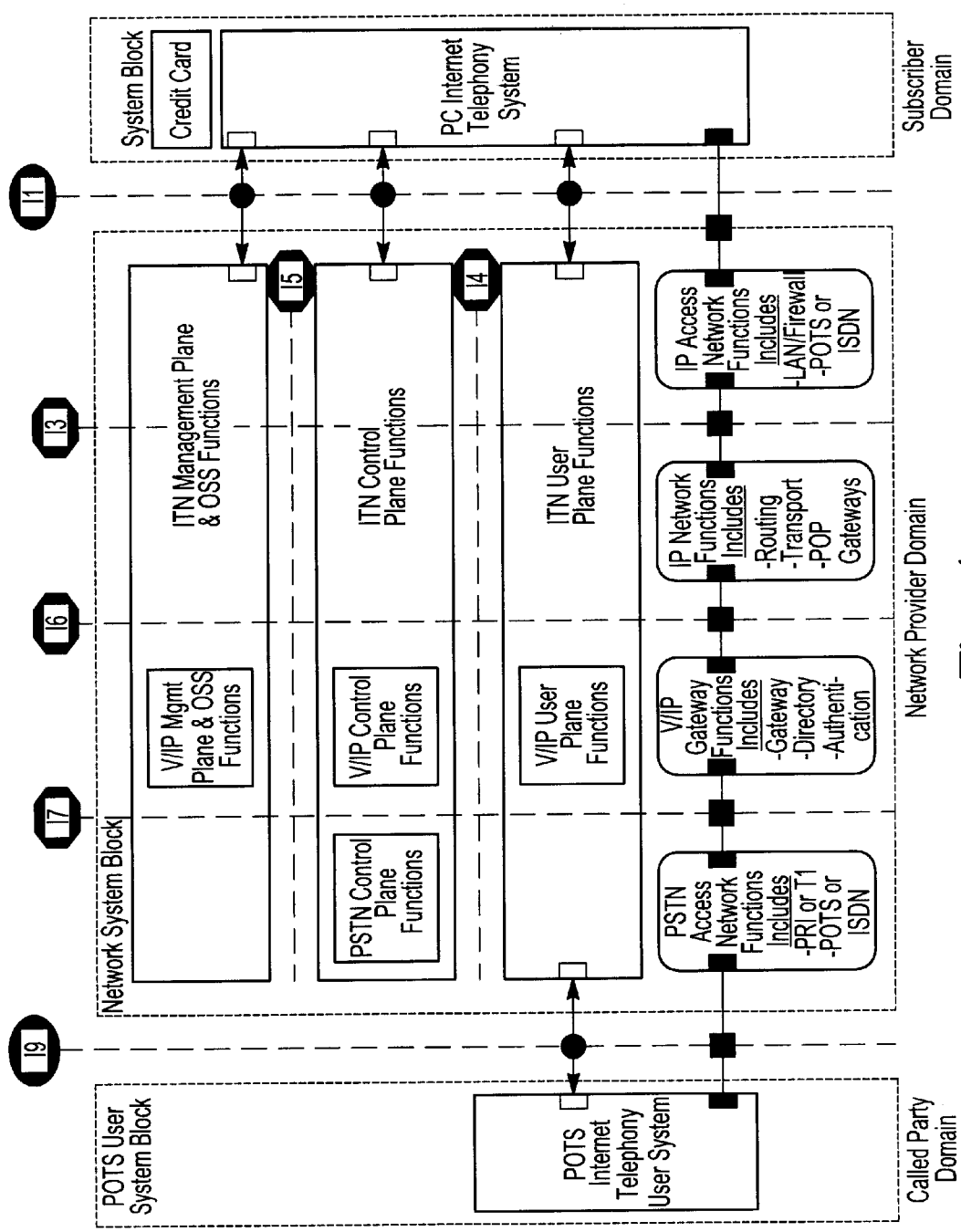
FIG. 4 is an Internet Telephony Network (ITN) block diagram showing the ITN system at a second level of partitioning (partition 2 level).

Referring to FIG. 4 there is provided an illustration of the ITN system at a second level of partitioning. Within this partitioning there are three planes (types of processes which span all the network elements involved with a service), and four types of network functions (domains of individual transport networks (e.g., PSTN or IP) over which communication must cross).

The three planes are:

The ITN User Plane Functions: These functions are those which are directly involved with real time communications transport and signal manipulation within a network.

The ITN Control Plane Functions: These are the functions which establish or set-up and tear-down communication paths across the User Plane.

The ITN Management Plane and Operations Support Systems Functions: These are the functions needed to provision and maintain the elements of the User Plane and Control Plane.

The four network functions are:

IP Access Network Functions (right or PC User Side): The IP access network is used locally on the PC user side simply to reach the IP network. This access may be direct via a LAN, or over a circuit switched PPP link connected to a Point of Presence (POP).

IP Network Functions: The IP network is the involved Intranet backbone and associated support systems (such as the DNS), this network provides the IP transport functions.

V/IP Gateway Functions: These are the network functions (and elements) which are involved primarily with supporting a Voice over IP service.

PSTN Access Network Functions (POTS User Side) The PSTN access network consists of the traditional PSTN connecting the Internet Telephony Gateway to the called telephone user.

Figure 5:
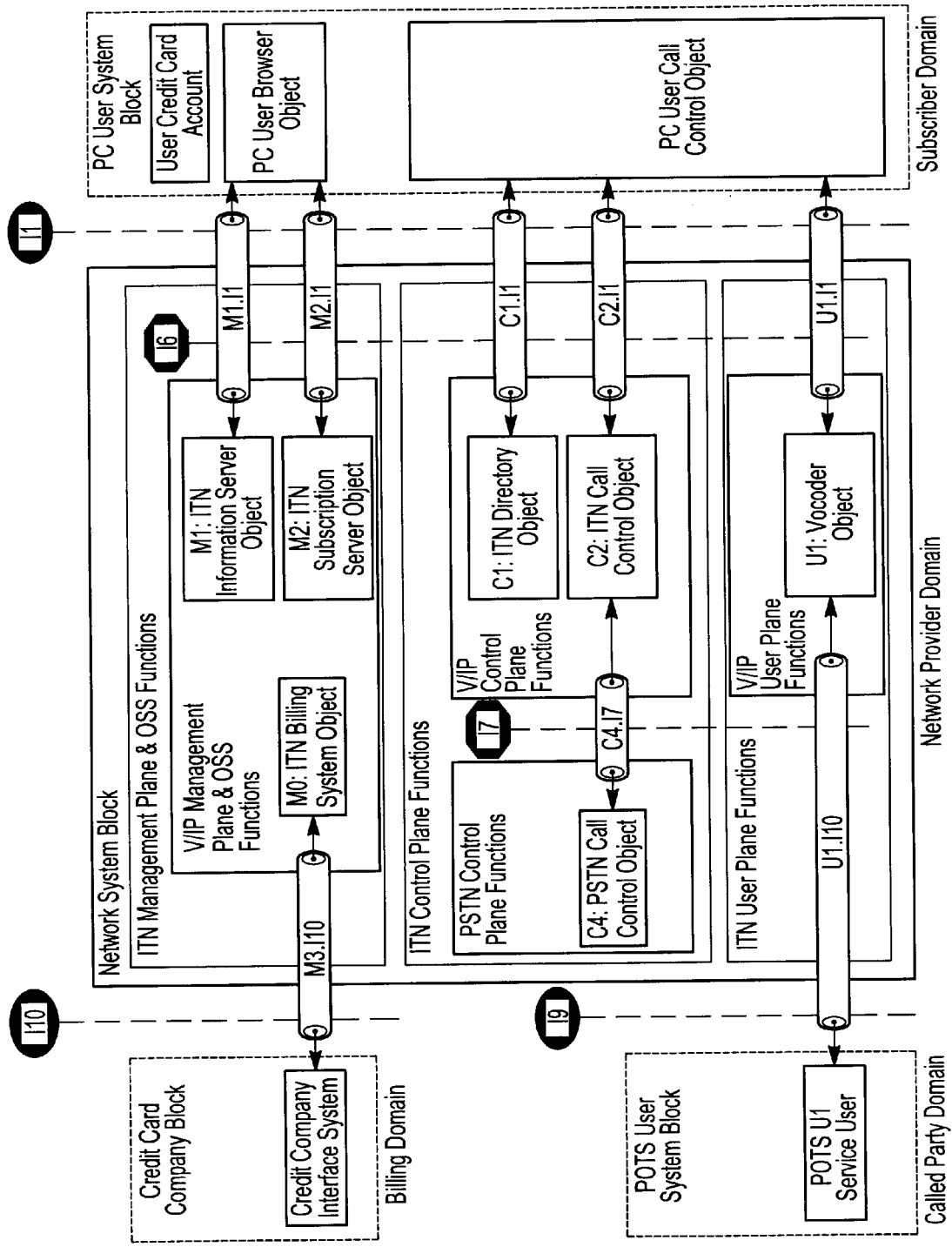
FIG. 5 illustrates the V/IP objects and interface relationships between users and the network, including external objects and interfaces.

The V/IP Gateway Functions and relationships to the other elements involved with the V/IP service are now described in relation to FIGS. 4 and 5. FIG. 4 illustrates interface references defined between the different User Planes and the different Network Functions. Although this partitioning has been done at the logical level, it is not necessary that physical systems be partitioned in this manner. As an example, an Internet Telephony Gateway may have functions spanning both the Control Plane (call setup) and User Plane (Vocoding).

The internal interface references designated within FIG. 4 are:

1. The interface between the Control Plane and the Management Plane functions is shown at I5. Management functions such as directory table maintenance, surveillance, and periodic billing exports cross the I5 interface.

2. The interface between the User Plane and the Control Plane Functions is shown at I4. Interfaces between various elements of the Control Plane are also designated as I4.

3. The interface between the V/IP Gateway and POTS Access Network is shown at I7.

4. The interface between the IP Network and the V/IP Gateway functions is shown at I6.

5. The interface between the IP Network and the PC Access Network is shown at I3.

6. For the sake of simplicity, one additional interface of lower utilization, I10, is not shown in FIG. 4. This interface is an external billing interface to a credit card provider and is shown and detailed in FIG. 5.

7. FIG. 5 illustrates the V/IP objects and interface relationships between users and the network, including external objects and interfaces. An object is a major process which has been identified within the functional specifications of the system. An interface is a communications path between two objects. External objects are objects which use interfaces that span between different network functions. By defining external objects and interfaces in this way, the V/IP system elements can be defined based on any communication which might be made across interfaces I6, I7, and I10 as shown in FIG. 5.

FIG. 5 shows a second level of partitioning illustrating the user, control and management planes within the network. Only those objects attached to a new or modified object for the V/IP service are shown. Other previously shown objects required for V/IP in the IP Management and Control Planes between I6 and I3 are not shown. The U1 PC to Phone service is a user plane service which is shown and defined in FIGS. 5 and 6.

Figure 6:
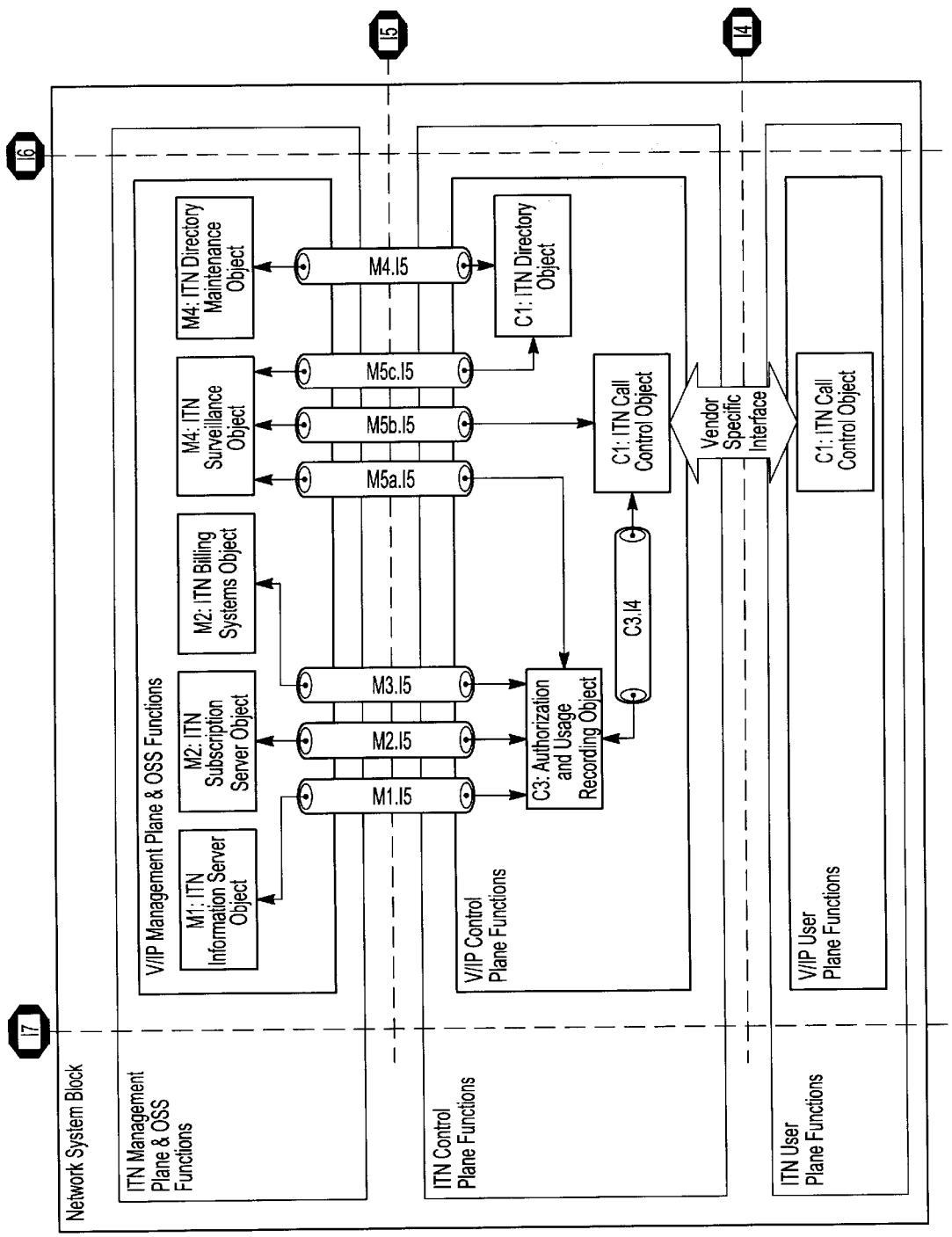
FIG. 6 illustrates the V/IP objects and interface relationships which have been defined between internal ITN objects.

FIG. 6 illustrates the V/IP objects and interface relationships which have been defined between internal ITN objects. Again only those objects or interfaces that are new or modified for V/IP are shown. Multiple objects may be contained within a single physical entity, and this physical entity may cross several planes.

The more significant objects and interfaces are now described in further detail.

ITN objects are considered to be partitions of the ITN processing requirements into sub-systems. A definition of ITN platform objects in this way, independent from protocol or message set constraints, provides a logical view of the system independent of those constraints.

User Plane Objects

U1 Object: Vocoder

The U1 Object converts packetized voice segments (which are encapsulated with IP) to and from circuit switched voice segments (which are encoded in Pulse Code Modulation (PCM)). The Vocoder performs various functions in order to accomplish this. It buffers a certain amount of packetized voice segments in order to maintain a continual flow on the circuit switched network. It dynamically assesses the delay characteristics of the transport network between the Vocoder and the User's software application in order to minimize those buffer requirements.

The Vocoder is able to handle all ITG ports in service, with all participants (on both sides of each call) talking at the same time. The Vocoder also identifies the level of packet loss resulting from voice transport across the IP network and maintains a record of that packet loss for summary reporting. Based on the level of packet loss, the Vocoder applies corrective algorithms to the voice wave form so that the resulting loss of signal quality is minimized for the called PSTN party.

The U1 Object is able to identify a loss of voice content packets, or a continuous stream of format errors in the encoded voice data incoming on the U1.I1 and U1.I10 interfaces (see FIG. 5). If such a condition is found and there has been no corresponding signaling at the control plane level, U1 will notify C2 to pull down the connection and perform any necessary clean up tasks.

User Plane Interfaces

Two user plane interfaces are defined:

External Entity to V/IP User Plane

1) U1.I1: The Internet Telephony Packetized Voice Interface is an external interface which is responsible for transporting Vocoded, packetized voice segments across the IP Access Network and IP Network.

2) U1.I10: The Circuit Switched Voice Interface is an external interface responsible for transporting PCM voice segments across the PSTN.

Control Plane Objects

Three control plane objects are defined:

1) C1: Internet Telephony Gateway Directory Object

2) C2: Internet Telephony Call Control Object

3) C3: Internet Telephony Authorization and Usage Recording Object (Internal)

The C1 Object: The Internet Telephony Gateway Directory manages which E.164 addresses (telephone numbers) are served within the terminating footprint of a particular ITG. The management of the terminating footprint may be in the form of NPA-NXX ranges which relate to an IP address for a single ITG. When queried with a "called" telephone number by the PC Call Control Object, the C1 object returns the IP address of the Internet Telephony Gateway (ITG) that serves the called telephone number.

The IP address of the V/IP Server is communicated to the PC user or Client software application prior to initiating contact with the C1 object. The object's TCP port number for the C1 directory application is defined, selected, and maintained within the client software.

The C2 Object: Internet Telephony Call Set-Up may be described as follows:

The ITN (ITG) communicates with the PC user to establish a PC-to-Telephone call. The call setup is originated by the PC user and destinated or terminated by the telephone user by supplying the address or number of the called terminal. However, it is the C2 Object or Call Control Object which coordinates the signaling among the involved network elements. Included in this signaling are:

Management of the state of the call with the client PC software (via C2.I1 shown in FIG. 5).

Validation of a PC users' Account number and password (via C3.I4 shown in FIG. 6).

Establishment and tear down of the PSTN circuit (via C4.I7 shown in FIG. 5).

Generation of usage information which is sent for processing and pricing (via C3.I4 shown in FIG. 6).

Managing the state of the connection within C3 (via C3.I4 shown in FIG. 6).

When initiating a V/IP call, the PC user may be required to provide the 10 digit E.164 (ITU-T telecommunication numbering or telephone number) address of the called telephone user, the IP address of the ITG associated with the called telephone user (obtained via the C1 Object), the PC's IP address, as well as the billing account number and associated password.

The C2 object is able to signal various states of a connection (ringing, busy, etc.) to a PC user. If the C2 object receives a maximum call duration from C3 during call set-up, this maximum call duration is sent to the PC software either as an audio message or as information to be presented on the PC screen. C2 generates the raw usage records which are sent to C3. A usage record is not tagged as billable unless the PC application has acknowledged its receipt of a connection establishment message. The C2 object may require a user ID and password to be provided by the PC Client software prior to completing a V/IP call. This information is authenticated via the C3 object.

The C3 Object: User Authorization and Usage Recording

The C3 Object ensures coordination between User Authorization and Usage Recording for a single PC user's customer account. C3 also responds to external requests for that information. C3 is a unitary logical object with distributed instances. That is, physically distributed account, authorization, validation and billing databases are so arranged as to be usable as a single logical object. The data associated with a user subscriber account is typically stored in an instance of C3 which is local to the user subscriber. The C3 Object is invoked during a call when an Authorization request is relayed over C3.I4 (this request typically consists of an account number and password provided by PC User). At this point C3 checks the account's password and available monthly minutes remaining, and responds appropriately to C2. Optionally, C3 can respond to C2 with a maximum allowable minute duration for a call. Successful account validation by the C3 Object is a prerequisite to successful call establishment by the C2 Object.

The C3 Object is also responsible for accepting usage recording data from C2, and decrementing the minutes used from the available minutes (and/or optionally pricing that usage, and decrementing that priced amount from a customer's existing balance), and then logging the information. Preferably, C3 also knows the state of a users connections across multiple ITGs. With this state information, the authorization system may ensure only one call per account is being handled by the network, and/or ensure that the maximum available minute limit is not being circumvented by multiple concurrent sessions (otherwise a second PC caller might receive authorization for a call prior to the posting of the first caller's usage record).

The theory behind bundling usage recording, pricing, and authorization into one logical object is to significantly reduce the potential for fraud when the system is widely deployed. By having a single logical database which is managing customer authentication, authorization, and usage pricing for the network, data synchronization is facilitated, and opportunities for fraud are minimized. As described, it is not necessary that C3 be implemented as a single physical system. The C2 Object will provide C3 with a customer billing account number and a password (originally supplied by the PC user). The C3 Object maintains a current account "minutes remaining" balance and usage records for each user on a monthly basis. This usage information can be extracted in real time based on a request from the M1.I5 interface as shown in FIG. 6.

If a user who is requesting authorization has a low "minutes remaining" balance, and this low balance will result in a maximum call duration which is shorter than the maximum call duration typically allowed by the network, then the Authentication server will transmit a maximum call duration back to the C2 Object.

The Control Plane Interfaces

Four control plane interfaces are defined:

External Entity to V/IP Control Plane

1) C1.I1: The Internet Telephony Directory Interface is an external interface which is responsible for PC to Directory services address resolution (see FIG. 5). The client PC provides the E.164 address (telephone number) of the intended party to be called, and the Directory service returns the IP address of the appropriate hop-off Internet Telephony Gateway.

2) C2.I1: The Internet Telephony Call Management Interface is an external interface which is responsible for PC to Internet Telephony Gateway signaling for call establishment and tear-down.

3) C4.I7: PSTN Call Management Interface is an external interface which is responsible for managing signaling to the PSTN which is necessary for the PSTN to establish and tear down circuit switched connections to the called party. Signaling from the ITG to the serving PSTN central office is preferably via PRI ISDN. Alternately, T1 E&M PSTN signaling may be used.

4) C3.I4: The Internet Telephony Authorization and Usage Recording Interface is an internal interface shown in FIG. 6, and is responsible for two functions. First the interface must allow for an authorization of ITG usage by a service subscriber. Second, the interface must maintain the current state of a subscriber's connections within C3, as well as pass ITG generated usage records from C2 to C3 in real time.

Management Plane Objects

Five management plane objects are defined and shown in FIG. 6:

1) M1: ITN Information Server & Feedback Object
2) M2: ITN Subscription Server Object
3) M3: ITN Billing System Object
4) M4: ITN Directory Maintenance Object (Internal)
5) M5: ITN Surveillance Object (Internal)

The M1 Object: The ITN Information & Feedback Server allows the PC user to access information on the V/IP service including general and user-specific information. Essentially, the M1 Object is the HTML interface to the V/IP network for subscribers of the service. Following is the information which the user might request from the ITN via HTML:

Descriptions on how to download and install client software and operate the service Descriptions of service availability and pricing plans Graphical (map) areas showing the ITG terminating footprints NPA-NXX ranges supported by the ITG terminating footprints Call usage record details (will extract the data from the control plane in real time via M1.I5)

Billing account status & balance (will extract the data real time via M1.I5)

Change of the ITN password (will verify old password and update to new password via M1.I5)

An introductory page, with links to each of the pages items listed above.

Operationally the M1 Object interface will be accessible via commercial browsers and at least a Netscape 3.0 or Internet Explorer 3.0 web browser. On any customer specific request for usage records or account balance, a PC user will have to provide within the query the same account number and password which is used for call establishment. This information will be validated by C3 when fulfilling the request.

The M2 Object: ITN Subscription Server: The ITP allows the PC user to subscribe to the V/IP service via an on-line process. Information gathered from the potential subscriber will include:

ISP (Internet Service Provider) account number

ISP email address

CPU type of PC, amount of memory

Type of sound card, microphone and speakers

Operating System and version

Global Service Provider (GSP)

Free disk space

Upon activation the subscriber will receive notification via email. This email will include instructions, the web page URLs (Uniform Resource Locator or www (World Wide Web) address) needed to get started, and an initial password (which can be changed via M1).

The M3 Object: ITN Billing System: Monthly, the M3 Object will poll C3 to extract account balances and credit card numbers in order to request payments from credit card companies. As account balances are processed by the M3 Object, failed billing attempts will be flagged in a report (either formatted as ASCII, or in a PC database product's format).

The M4 Object: ITN Directory Maintenance: Directory data (in the form of NPA-NXX ranges pointing to ITGs) will be created, validated, and managed outside of the network (away from C1, the ITN Directory Object). The M4 object is responsible for this function. M4 will accomplish this by assisting in the creation of the Directory tables in a format which can be exported directly (via M4.I5) to C1. The M4 Object preferably also supports the creation of graphical maps showing the terminating call areas supported by the ITGs. The maps and the NPA-NXX table information may be exported so that it may be presented to the user via M1. Off the shelf software products like MapInfo may be used to support the requirements of M4.

Operationally the M4 Object is able to import NPA-NXX data, along with supporting graphical central office serving area information. The object is able to graphically define ITG terminating calling areas. The M4 Object automatically generates the NPA-NXX to ITG IP address Directory table based on the graphical information provided above. The M4 Object supports multiple versions of the C1 Object Directory database.

The M5 Object: ITN Surveillance: The V/IP service may cross many network elements within the ITN. Having a centralized surveillance capability which can span multiple platforms ensure its operation. The M5 Object attempts to identify and log critical alarms, and to present these alarms to an administrative console. Such alarms may include: Whether a network based application is under distress (via an SNMP Management Information Block (MIB)), whether the system is alive and communicating with the network (via "Ping" or similar function), whether required application processes are active and if they need to be restarted (via a "ps -eaf" or similar function), whether the processes are sane (via periodic test queries to validate correct responses).

These types of problems may be analyzed by M5, and alarms generated and logged within C5 at four levels: Critical (service affecting), Major (user intervention recommended), Minor (of note), and Informational (components reporting normal operation). These alarms may be used to manage a local database containing managed objects representing the current operational state of ITN platforms and processes. Each managed object and/or platform will be assigned one of three operational states: Red (out of service), Orange (operating with degraded capabilities), and Green (operating normally). A graphical representation of the ITN network is presented to a console via a standard display package such as OpenView. Console operators have the option of directly connecting to any ITN object or system to perform troubleshooting or diagnostic operations. This connection presents the console operator with the same capabilities as a local system administrator.

With respect to MS addressing requirements, new elements added to the ITN will have their IP addresses and their type of object identified in MS. The MS Object will create its database of managed objects dynamically (once given the IP address or host name) via the M5x.I5 interfaces.

Management Plane Interfaces

Ten Management Plane Interfaces have been defined:
External Entity to V/IP Management Plane 1) M1.I1: Internet Telephony Data Request Interface 2) M2.I1: Internet Telephony Subscription Interface 3) M3.I10: Credit Card Provider Interface V/IP Management Plane to V/IP Control Plane 4) M1.I5: Internet Telephony Network Data Extraction Interface 5) M2.I5: Internet Telephony Subscription Management Interface 6) M3.I5: Internet Telephony Billing and Usage Extraction Interface 7) M4.I5: Internet Telephony Directory Maintenance Interface 8) M5a.I5: Internet Telephony Call Management Surveillance Interface 9) M5b.I5: Internet Telephony Authorization and Usage Recording Surveillance Interface 10) M5c.I5: Internet Telephony Directory Surveillance Interface The functions of these interfaces are as follows:

The M1.I1 Interface: The Internet Telephony Data Request external interface is responsible for providing a subscriber with data requested about the ITN in real time.

The M3.I10 Interface: The Credit Card Provider external interface is responsible for allowing an ISP to place a charge against a user's credit card account number.

The M1.I5 Interface: The Internet Telephony Network Data Extraction internal interface is responsible for providing the M1 Object with real time data regarding a subscriber's remaining minutes of use, usage records of the current and previous billing cycle, and/or calls currently in progress.

The M1 Object will reformat and present this data to the subscriber who requested it.

The M2.I5 Interface: The Internet Telephony Subscription Management internal interface is responsible for managing the list of account numbers allowed to use the ITN. This interface supports several functions: an initial batch load of subscribers and initial passwords, adding or removing individual account numbers, and resetting individual passwords.

The M3.I5 Interface: The Internet Telephony Billing and Usage Extraction internal interface is responsible for performing a periodic extraction of usage records from the network.

The M4.I5 Interface: The Internet Telephony Directory Maintenance internal interface is responsible for maintaining the NPA-NXX to hop-off ITG directory data.

The M5a.I5 Interface: The Internet Telephony Call Management Surveillance internal interface is responsible for carrying a variety of information which allows M5 to assess the availability, health, and status of the physical computer and software processes of the various Internet Telephony Gateways.

Figure 7:
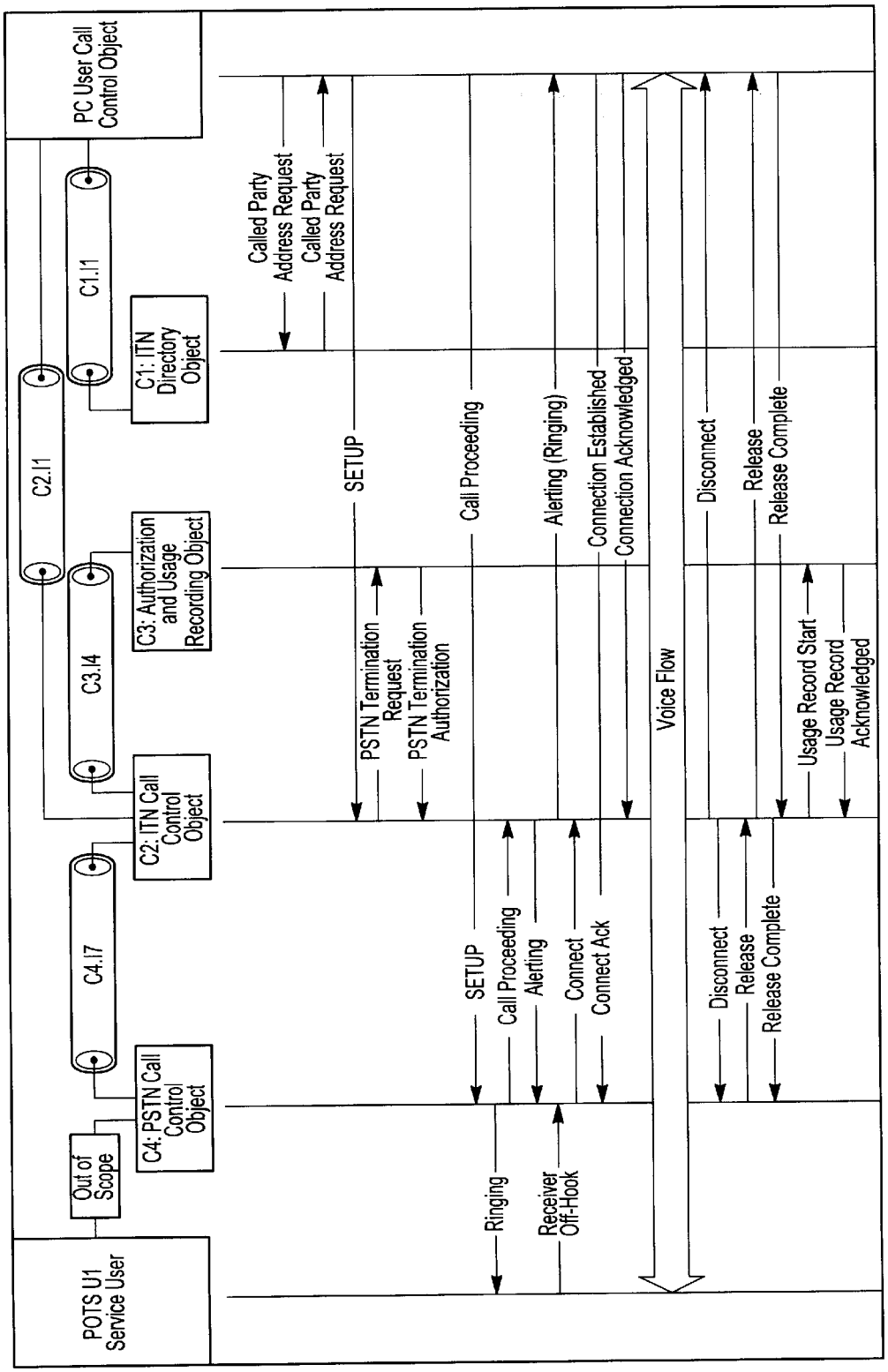
FIG. 7 is a diagram of a typical control plane message flow.

Based on the foregoing descriptions of the interfaces and objects a high level call flow of signaling messages is described. FIG. 7 illustrates an example diagram of such a control plane message flow. This example should be understood to show one version or embodiment of a set of messages which may be implemented for a PC to PSTN service. Converse messages would be utilized for a PSTN initiated PSTN to PC service, as well as appropriate corresponding messages for PC-PC and telephone-telephone service. Additional messages may be added if enhanced functionality is provided.

The call flow starts at the point where the user has established IP layer connectivity with the network, and has invoked the V/IP software application. This preliminary procedure typically entails the following steps by the party initiating the call (not illustrated in FIG. 7):

1. The customer will boot the PC, and connect to the IP network following their existing procedures for network access.

2. The customer will launch their V/IP application, either as a plug-in to an existing browser or as a stand-alone application. When launched, this application will present a template of fields which are required to initiate a call.

3. The customer will populate a "telephone number to be called" data field. The customer will also either populate his/her account number and password, or the application will reapply this data if it has been previously saved within the application.

4. The customer will then initiate the call. During the call, the call's completion status will be presented in real-time to the user by the application (via a visual display). One example of the call initiation procedure is now described.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application as described in the foregoing preliminary procedure, the C1 Object returns the IP address of the associated ITG (C2 Object).

2. The PC's V/IP software application invokes the C2 Object to set up a call by passing to C2 the number to be called, the user's account number, and a password. This is shown as SETUP in FIG. 7.

3. C2 invokes the C3 Object in order to receive authorization to proceed with the call (PSTN Termination Request). This may entail communication among instances of the distributed database to verify the account status of the caller and optionally set a limit on the duration or cost of the call depending upon the account status and/or balance. The pricing of the call may be communicated to C2 for communication to the caller. C3 will pass the authorization information back to the C2 (PSTN Termination Authorization).

4. If authorization was successful, C2 will establish the PSTN connection, and notify the client software that the call is proceeding (SETUP Call Proceeding). C2 may also pass on to the calling PC the pricing information obtained from C3. C2 will continue to update the client software with call establishment information as the call is proceeding and may also pass along to the caller a running account of the cost of the call.

5. After the call has been established, the PC will respond to the network that it recognizes that a connection has been established (Connection Acknowledged), timing of the call's duration can be initiated, and any usage measurements will indicate that the call is billable.

6. Steady state call (Voice Flow).

7. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.

8. The C2 Object passes a usage record to C3 for reporting. The C3 Object may also initiate individual call billing by reporting to M3 as shown in FIG. 6.

Figure 8:
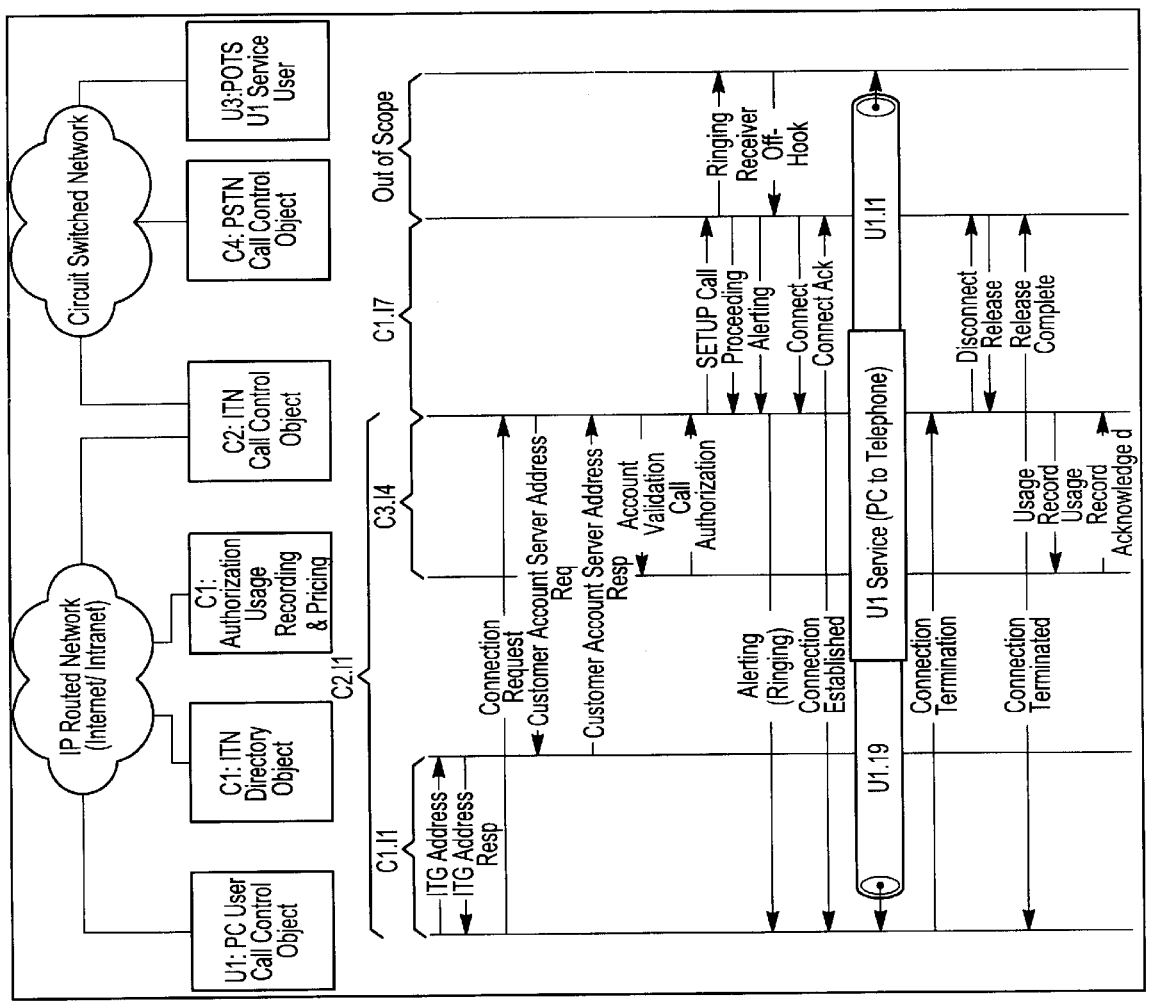
FIG. 8 is a diagram of another typical control plane message flow.

A modified version or embodiment of the call set up procedure is now described in connection with FIG. 8.

The following steps commence with the Called Party Address Request step in FIG. 7 and proceed as follows:

1. The user initiates a call via the PC's V/IP software. This software application invokes the Directory (C1 Object) to obtain the IP address of the destination ITG. Based on the dialed number submitted by the PC application, the C1 Object returns the IP address of the associated ITG (C2 Object).

2. The PC's V/IP software application invokes the C2 Object to set up a call by passing to C2 the number to be called, the user's account number, and a password (Connection Request).

3. The C2 Object invokes the C1 Object to request the customer account server address (Customer Account Server Address Req), which is then returned (Customer Account Server Address Resp).

4. The C2 Object invokes the C3 Object for account validation (Account Validation) using the Customer Account Server Address (address of the instance of the C3 object database) and receives call authorization (Call Authorization). This may include limitations as described in connection with the description of FIG. 7.

5. If authorization was successful, C2 will establish the PSTN connection, and notify the client software that the call is proceeding. C2 will continue to update the client software with call establishment information as the call is proceeding.

6. After the call has been established, the PC will respond to the network that it recognizes that a connection has been established (Connect Ack), timing of the call's duration can be initiated, and any usage measurements will indicate that the call is billable.

7. Steady state call (U1 Service PC to telephone).

8. The PC's V/IP software application invokes the C2 service to release the call. The PC application signals release to C2, and C2 releases the call in the PSTN and confirms the release back to PC application. Also, timing of the call's billable duration is completed. Alternatively, the PSTN user may initiate call tear down as well.

9. The C2 Object passes a usage record to C3 for reporting and for individual call billing if that option is chosen. The C3 Object acknowledges receipt of the usage record to C2.

Figure 9:
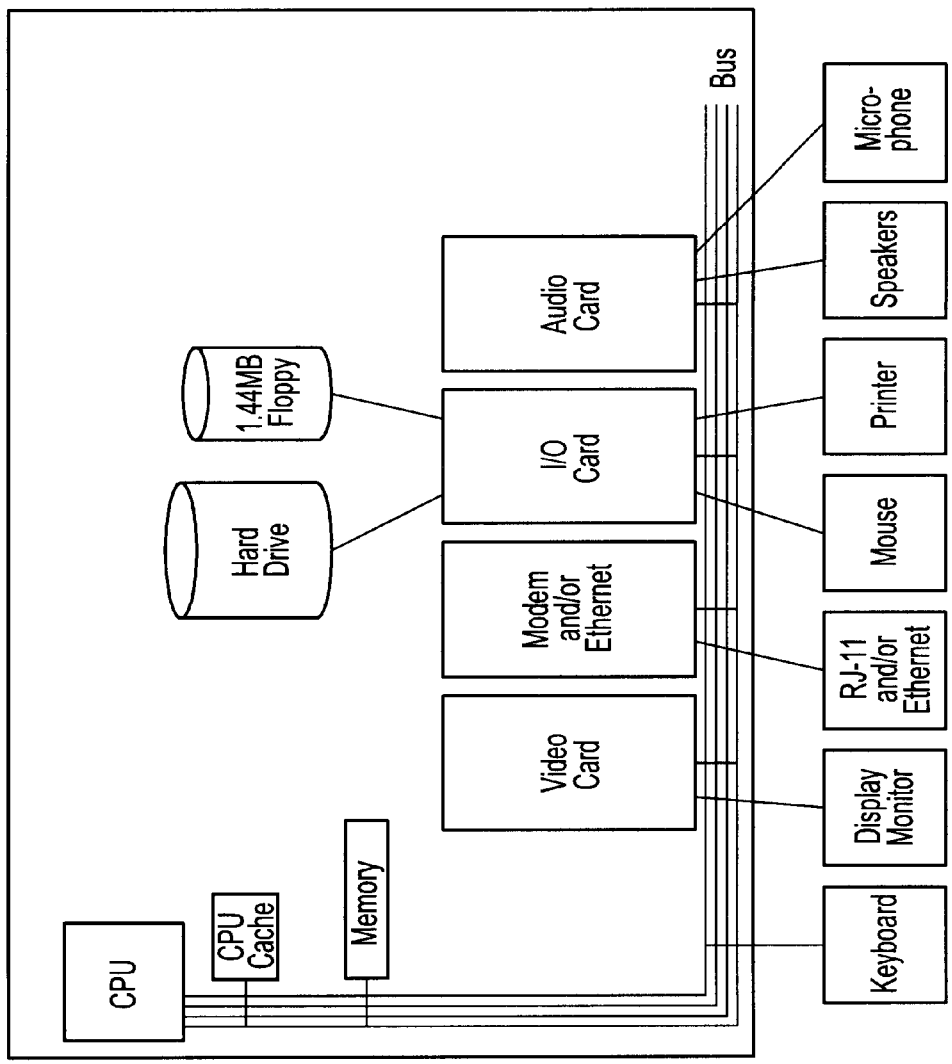
FIG. 9 provides a high level diagrammatic illustration of a typical PC which may be utilized by a user in the system of the invention.

FIG. 9 provides a high level diagrammatic illustration of a typical PC which may be utilized by a user in the system of the invention.

Figure 10:
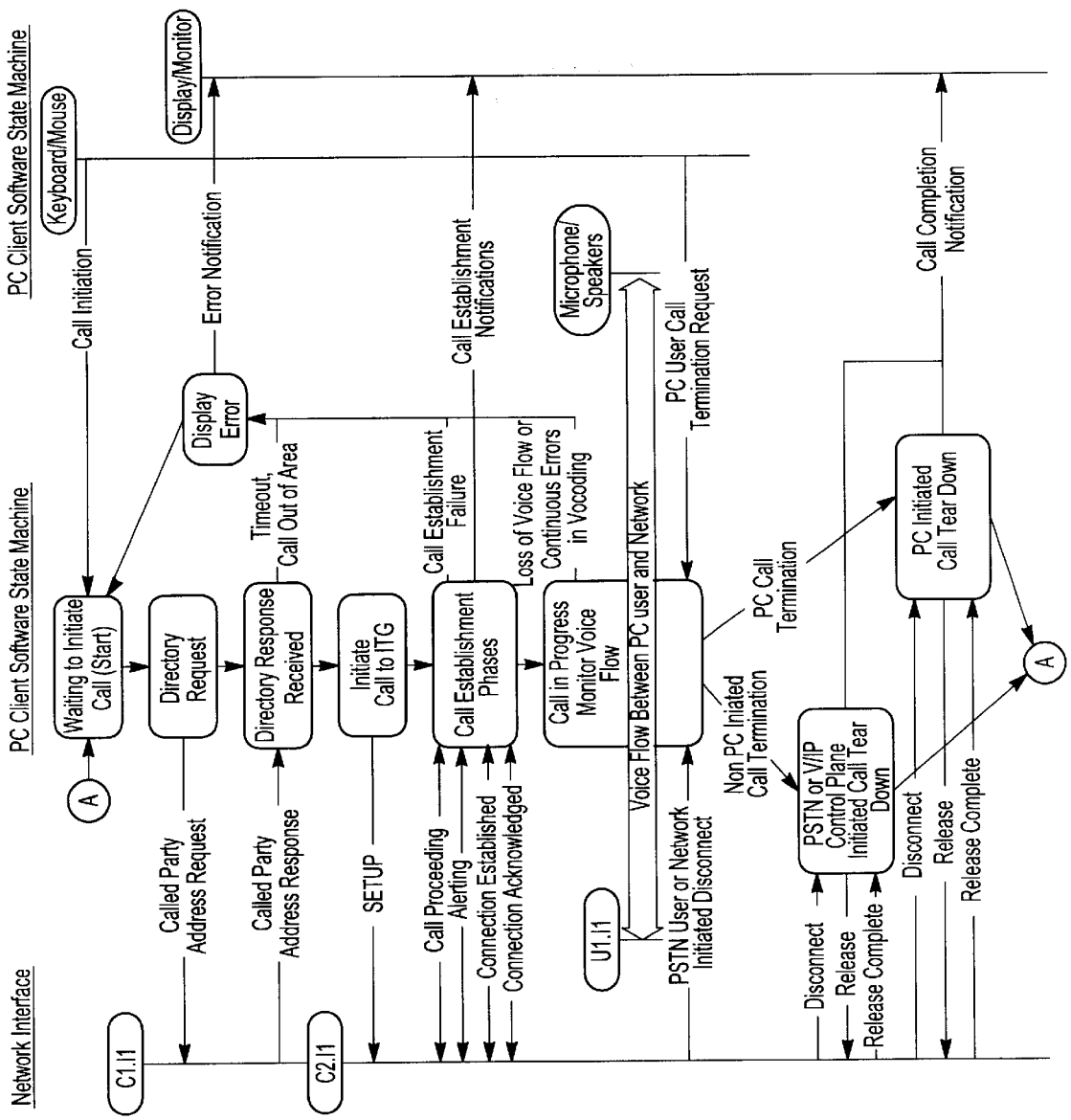
FIG. 10 illustrates a typical client software state machine.

FIG. 10 illustrates a typical client software state machine which is executed in the subscriber's PC. The V/IP software state machine correlates operations within the environment of the typical/high end PC of the user. FIG. 10 provides an example of how the end user interacts with the V/IP network via the client software. Interaction between the PC user and the software's state machine utilizes messages which cross between the client software's state machine and the operating system's input/output drivers for each hardware device. The more significant messages and the content which they may carry may be summarized as follows:

Keyboard/Mouse

Call Initiation: This comprises the input of information needed by the state machine (and the V/IP control plane) which is required to establish a call. The information includes the calling party's account number and password, as well as the telephone number being called.

PC User Call Termination Request: This comprises the input of a notification by the user to the software to conclude the call.

Display/Monitor

Error Notification: This comprises a dialog which shows the reason for the failure of a particular call.

Call Establishment Notification: This refers to the display information showing the step-by-step progression of a call as it is established through the network.

Call Completion Notification: This comprises a dialog which shows the statistics of a completed call.

Figure 11:
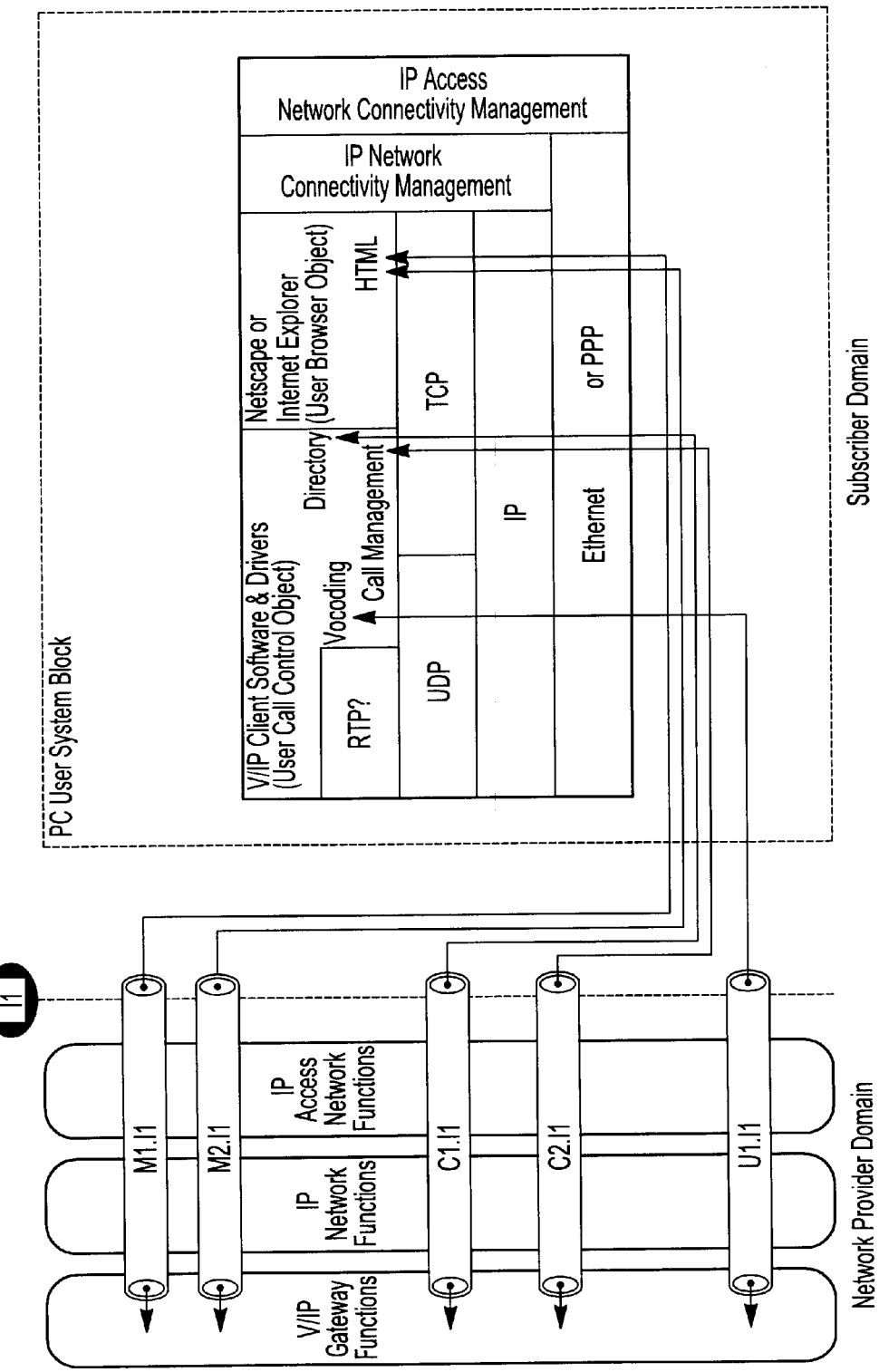
FIG. 11 shows the PC software interface and the relationship to the ITM interfaces.

FIG. 11 shows the PC software interfaces (stack) and the relationship to the ITN interfaces. It is necessary that the V/IP software state machine fit seamlessly within the environment of a typical high end PC owned by an ISP subscriber. FIG. 11 shows how the state machine interacts with the other software components for Internet connectivity and communication. Using the types of PC shown in FIG. 9, state machine shows in FIG. 10, and interface relationships shown in FIG. 11, the following customer software characteristics and functions are significant:

1. It is not necessary for the client software to validate that IP Access Network or IP Network connectivity has been established prior to attempting to communicate with the network. The availability of connectivity across these layers is assumed. A lack of response by the network to the application's state machine is displayed to the user as a lack of network level connectivity.

2. Each of the five V/IP network interfaces is able to have their transactions traverse seamlessly across the IP Access Network and IP Network. The client software should use the same IP network drivers which are used for their existing ISP Internet connectivity. Client software driver conflicts or adverse interactions should not occur with the installed base of PC software.

3. All management plane interfaces with the user may be via the PC's existing Web Browser. The client software need not take on the task of managing network based customer data.

4. The compressed voice interface, U1.I1, preferably communicates via UDP (User Datagram Protocol), however, RTP (Routing Table Protocol) on top of UDP is also an option. If RTP is used, the client software should validate that it is a valid option over the existing IP network.

5. If RTP is selected, and communication over the IP Access network is performed with a PPP link, RTP header compression should be supported in order to reduce the required IP Access network bandwidth.

6. The software must be able to transmit DTMF digits to the hop-off ITG. Preferably the digits will be transmitted "out of band" (in other words, the PC will not generate DTMF signals which are transmitted as compressed tones).

7. The software should be able to transmit the length (duration) that a DTMF digit a pressed.

8. The software should display to the user the current state of a call as it is made through the Internet Telephony Gateway (ITG).

9. The voice played back to the PC user will be toll quality. The Vocoder includes capabilities such as echo cancellation, it should be able to handle varying levels of packet loss and latency, and it should be able to apply corrective algorithms to the voice stream.

10. A user account number and password should be required within the Call Initiation message to the state machine. If the user so chooses, these items should be able to be saved within the client application.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. In a hybrid communication network comprising a switched telephone network and a packet switched network connectable to terminals for communication therebetween, a method of communication session management comprising the steps of:

a) at a session control object connected between said switched telephone network and said packet switched network, receiving an address of a called one of said terminals from a calling one of said terminals via the packet switched network, as a request to initiate an audio communication session therebetween via the switched telephone network and the packet switched network;

b) authenticating with respect to the calling terminal, account validating for the calling terminal, pricing, and authorizing a communication session between said calling and called terminals from a unitary logical object connected to the packet switched network;

c) signaling said authorization to the session control object, via said packet switched network;

d) initiating a link for the audio communication session from said session control object via the switched telephone network to the called terminal to enable the audio communication via the switched telephone network and the packet switched network, in response to the authorization of the communication session; and e) maintaining by said unitary logical object of a record of the initiation, progress, pricing and termination of said audio communication session on a substantially real time basis.

2. A method according to claim 1 wherein said unitary logical object is distributed and comprises multiple instances thereof.

3. A method according to claim 2 wherein said instances of said unitary logical object are coded to at least a portion of the address of the calling terminal.

4. A method according to claim 1 including the step of recording from said session control object of a record of the initiation and termination of said communication session.

5. A method according to claim 1 including the step of signaling pricing of the terminal to terminal-terminal communication session to the calling terminal-terminal prior to establishing said communication session.

6. A method according to claim 5 including the step of signaling the price of the terminal-terminal to terminal-terminal communication session to the calling terminal at the termination of said communication session.

7. A method according to claim 6 including the step of signaling the current cost of the terminal to terminal communication session to the calling terminal-terminal on a substantially real time basis during said communication session.

8. A method according to claim 1 including the step of recording the billing data upon the termination of the communication session.

9. A method according to claim 1 wherein said switched telephone network comprises a telecommunication network.

10. A method according to claim 9 wherein said packet switched network comprises the Internet.

11. A method according to claim 10 wherein one of said terminals is a computer and one of said terminals is a telephone.

12. A method according to claim 1, further comprising the step of debiting from a predetermined balance in an account of the calling terminal upon termination of the session.

13. A method according to claim 1 including the step of maintaining by said session control object of a record of the initiation, progress, pricing and termination of said communication session on a substantially real time basis.

14. A method according to claim 1 wherein said session control object comprises a gateway between said switched telephone network and said packet switched network.

15. In a hybrid communication network comprising a switched telephone network and a packet switched network connectable to terminals for communication therebetween, a method of session management comprising the steps of:
   a) inputting from a calling one of said terminals which maintains plural accounts debitable for use of said hybrid communication network an address of a called one of said terminals and identification of one of said plural accounts to be debited to initiate a communication session;
   b) authenticating, validating the identified account, pricing, and authorizing a communication session between said calling and called terminals from an instance of a divided unitary logical object, said instance being identified by the identified account, said unified logical object being connected to the packet switched network;
   c) signaling said authorization to a session control object connected to said switched telephone network and said packet switched network;
   d) responsive to the signaling of authorization, initiating audio communication through the networks between the calling and called terminals via said session control object; and
   e) maintaining by said unitary logical object of a record of the initiation, progress, pricing and termination of the audio communication session on a substantially real time basis.

16. A method according to claim 15 wherein said instance of said unitary logical object identified is owned by an entity different than one or more entities owning other instances of said unitary logical object.

17. A method according to claim 15, further comprising the step of debiting from a predetermined balance in the identified account of the calling terminal upon termination of the session.

18. A method according to claim 16 wherein said switched telephone network is a public switched telephone network (PSTN) and the identified account of the calling terminal is a PSTN account.

19. A method according to claim 16 wherein said switched telephone network comprises a telecommunication network.

20. A method according to claim 17 wherein said packet switched network comprises the Internet.

21. A method of providing telephone service across a hybrid combination of a switched telephone network and the Internet, comprising the steps of:
   a) providing a unitary logical database having distributed instances on the Internet;
   b) establishing for each Internet telephone service subscriber at least one billing and authorization account maintained in at least one of said distributed instances of said database;
   c) during set-up of a requested telephone call, receiving identification and password information from a calling subscriber at an Internet gateway between the switched telephone network and the Internet;
   d) communicating with an instance of the database where said calling subscriber's billing and authorization account is stored to ascertain the billing algorithm for the call requested for set-up;
   e) informing the calling subscriber of the billing algorithm;
   f) establishing a communication link for the telephone call through the switched telephone network and the Internet; and
   g) on termination of the call, storing usage data for the call in said database.

22. A method according to claim 21 including the steps of maintaining in said billing and authorization account of said subscriber an account balance; and upon storing of said usage data debiting said account balance with said usage data.

23. A method according to claim 21 wherein said billing and authorization account of said subscriber is maintained in an instance of said database in communication proximity to said gateway.

24. A method according to claim 22 including the steps of obtaining from the calling subscriber during set-up the telephone number of a called terminal for the requested call set-up, and determining from said telephone number the address of an Internet exit gateway for establishing the call to said terminal.

25. A method according to claim 21 including the step of communicating to said calling subscriber during said call the current cost of said call.

26. A method according to claim 25 wherein said cost is communicated to said calling subscriber in substantially real time.

27. A method according to claim 21 wherein said usage data is associated with said account database in substantially real time upon termination of said call.

28. In a hybrid communication network comprising a switched telephone network and a packet switched network connectable to terminals for communication therebetween, at least a plurality of said terminals having accounts for use of said hybrid communication network, a method of session management comprising the steps of:

a) receiving from a calling one of said terminals having at least one such account an address of a called one of said terminals and identification of one of said accounts to initiate a communication session;

b) authenticating, validating the identified account, pricing, and authorizing a telephone communication session between said calling and called terminals from an instance of a divided unitary logical object, said instance being identified by the identified account, said unified logical object being connected to the packet switched network;

c) signaling the authorization to a session control object connected to said switched telephone network and said packet switched network;

d) in response to the signaling of the authorization, initiating a telephone communication session from said session control object, through the switched telephone network and the packet switched network; and e) maintaining by said unitary logical object of a record of the initiation, progress, pricing and termination of said telephone communication session on a substantially real time basis.

29. A method according to claim 28 including the step of debiting the identified account of the calling terminal upon termination of the session.

30. A method of providing telephone service across a hybrid combination of a switched telephone network and the Internet, comprising the steps of:

a) providing a unitary logical database having distributed instances on the Internet;

b) establishing for each Internet telephone service subscriber at least one billing and authorization account maintained in at least one of said distributed instances of said database;

c) during set-up of a requested telephone call, receiving identification and password information through the Internet from a calling subscriber at an Internet gateway between the switched telephone network and the Internet;

d) communicating through the Internet with an instance of the database where said calling subscriber's billing and authorization account is stored to ascertain the billing algorithm for the call requested for set-up;

e) informing the calling subscriber of the billing algorithm;

f) establishing a communication link for the telephone call through the switched telephone network from the Internet gateway and enabling communication via the Internet and the link through the switched telephone network; and g) on termination of the call, storing usage data for the call in said database.

31. In a hybrid communication network comprising a switched telephone network and a packet switched network connectable to terminals for communication therebetween, at least a plurality of users having accounts for use of said hybrid communication network, a method of session management comprising the steps of:

a) receiving from a calling one of said terminals an address of a called one of said terminals and identification of one of said accounts to initiate a telephone communication session;

b) validating the identified account, determining a balance existing in the identified account, and authorizing a telephone communication session between said calling and called terminals from a logical object connected to the packet switched network;

c) signaling the authorization to a session control object connected to said switched telephone network and said packet switched network;

d) in response to the signaling of the authorization, establishing the telephone communication session between the calling and called terminals, from said session control object, through the switched telephone network and the packet switched network;

e) determining a charge for the established telephone communication session; and f) debiting the charge from the balance in the identified account.

\* \* \* \* \*